Feb. 9, 1932.  W. A. BLUME  1,844,496
FRICTION BRAKE
Filed Nov. 9, 1928
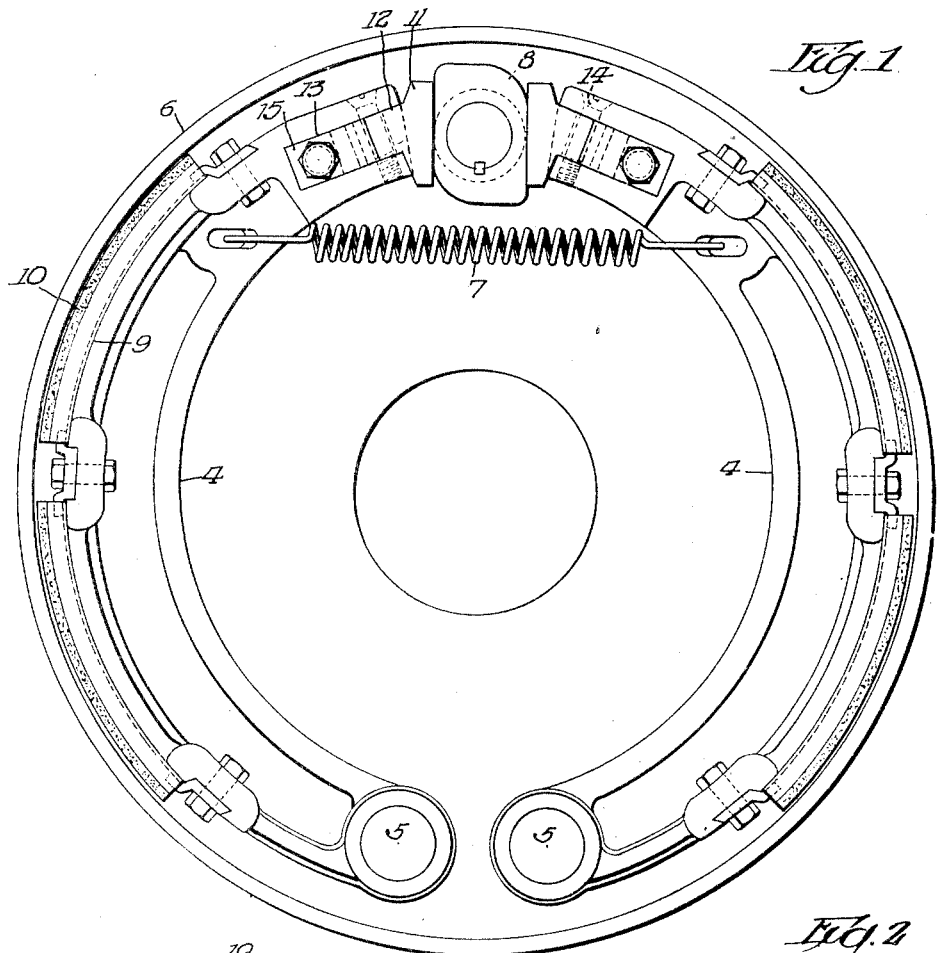
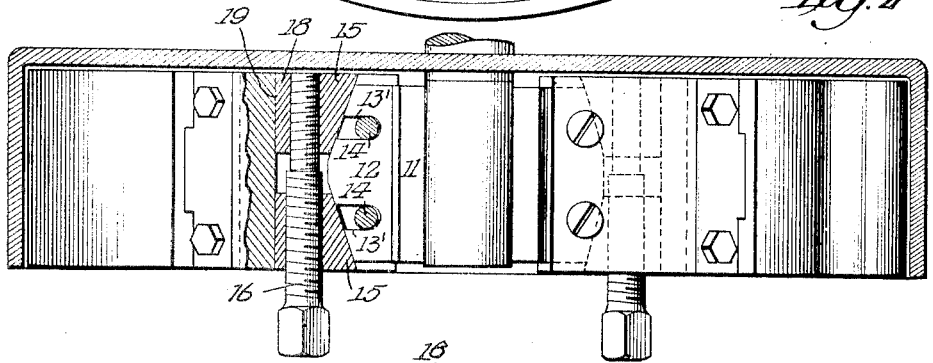
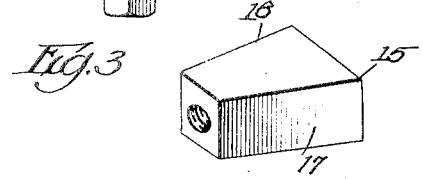
Inventor:
William A. Blume
By Wm. O. Belt Atty.

Patented Feb. 9, 1932

1,844,496

UNITED STATES PATENT OFFICE

WILLIAM A. BLUME, OF DETROIT, MICHIGAN, ASSIGNOR TO AMERICAN BRAKE MATERIALS CORPORATION, OF NEW YORK, N. Y., A CORPORATION OF NEW YORK

FRICTION BRAKE

Application filed November 9, 1928. Serial No. 318,210.

This invention relates to friction brakes and more particularly to means for compensating for the wear of the friction blocks in service.

The object of the invention is to provide a simple and efficient means for easily adjusting the parts of a friction brake to adjust the shoes or heads which support the friction material and compensate for the wear of the friction material in service.

In the accompanying drawings I have illustrated the invention in a selected embodiment and referring thereto:

Fig. 1 is a side elevation showing an internal brake mechanism in a brake drum.

Fig. 2 is a sectional view; and

Fig. 3 is a detailed view.

Referring to the drawings 4—4 are shoes or heads pivoted at 5—5 within a drum 6 and held by the spring 7 in operative engagement at their free ends with the operating cam 8. This is a familiar assembly in friction brakes and the shoes or heads have brake blocks 9 mounted thereon, as shown in Fig. 1, or they have brake linings applied thereto as is well known in the art. The friction material 10 or the brake block makes frictional contact with the inner surface of the rim of the drum. To compensate for the wear of the friction material means are provided in the free ends of the shoes or heads so that they may be adjusted to provide the proper clearance between the friction blocks and the rim of the drum and also provide for the proper frictional engagement of the friction blocks with the rim of the drum when the cam is operated. This means comprises a bearing block adjustably mounted at the free end of each shoe, the block having a head 11 to engage the cam and a shank 12 slidably mounted in a recess 13 at the end of the shoe.

The shank of the block is slotted lengthwise at 13' to receive screw bolts 14 at the end of the shoe. Two wedge blocks 15 are arranged in the recess behind the shank of the bearing block and a right and left threaded screw bolt 16 is engaged with these wedge blocks to move them inwardly or outwardly and simultaneously for adjusting the bearing block. The rear end of the shank 12 is inclined forwardly from its middle to its sides and the wedge blocks have inclined sides 17 to engage the inclined end walls of the shank. The opposite sides 18 of the wedge blocks are straight to engage the straight back wall 19 of the recess. It will readily be seen that the bearing block may be adjusted outwardly by turning the screw bolt to move the wedge blocks inwardly toward each other; and that the bearing block may be adjusted inwardly by the spring 7 when the screw bolt is turned to move the wedge blocks outwardly away from each other, the bearing block being guided in all adjustments on the screw bolts 14.

This forms a simple and efficient means for easily and quickly adjusting the shoes for properly adjusting the friction material, whether it is brake blocks, brake linings or other friction material, to the part to be braked in a particular installation, and to compensate for the wear of the friction material in service. The wedge blocks and the operating bolts are disposed transversely of the brake mechanism so that they can be easily, rigidly and readily adjusted as required without necessitating the removal of the wheel or any other parts of the vehicle.

I reserve the right to make all such changes in the form construction or arrangement of parts of the invention as fall within the scope of the following claim:

I claim:

A brake shoe for a friction brake having a pivot end and a recessed free end, a bearing block having a shank slidably arranged in said recess and carrying a head at the free end of the shoe, the rear end of the shank being inclined forwardly from its middle to its sides, wedge blocks arranged in the recess behind the shank, a right and left threaded screw bolt engaged with said wedge blocks to move the same toward and away from each other for adjusting the block relative to the shoe, and guides mounted in the shoe and extending across the recess in the path of adjustment of the block, the shank having parallel slots located between the middle and the sides of the shank and extending longitudinally through the rear end of the shank and receiving said guides for maintaining the block in fixed lateral position in the recess.

WILLIAM A. BLUME.